Figure 1:
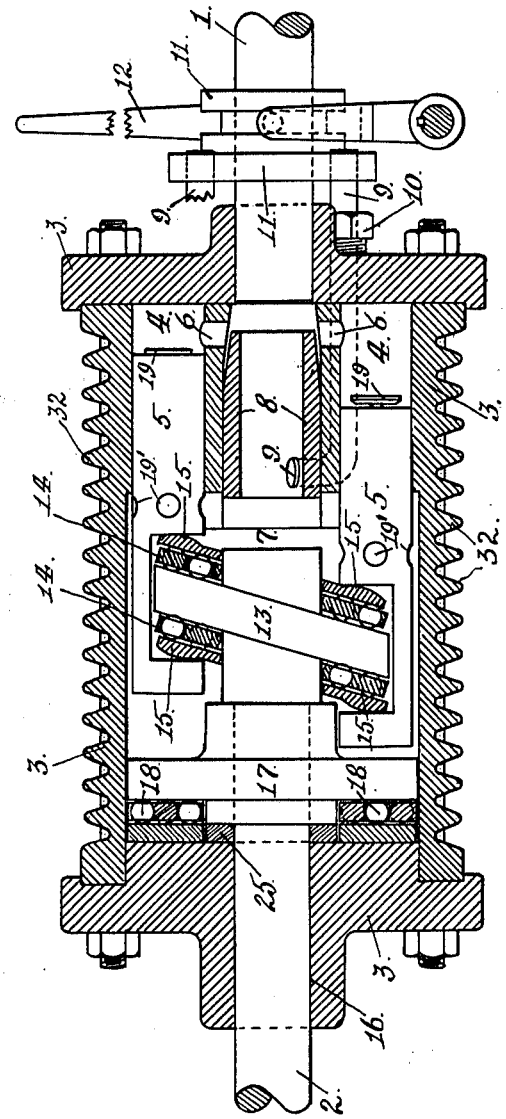

C. D. McCLINTOCK.
POWER TRANSMITTING MECHANISM.
APPLICATION FILED AUG. 4, 1909.

970,640.

Patented Sept. 20, 1910.

WITNESSES
N. G. Acker
S. Constine

INVENTOR
Charles David McClintock
BY
Wm. F. Booth
ATTORNEY

UNITED STATES PATENT OFFICE.

CHARLES DAVID McCLINTOCK, OF FRUITVALE, CALIFORNIA, ASSIGNOR OF ONE-HALF TO SAMUEL RUSSELL BOGUE, OF SAN FRANCISCO, CALIFORNIA.

POWER-TRANSMITTING MECHANISM.

970,640.  Specification of Letters Patent.  Patented Sept. 20, 1910.

Application filed August 4, 1909. Serial No. 511,096.

*To all whom it may concern:*

Be it known that I, CHARLES DAVID MC-CLINTOCK, a citizen of the United States, residing at Fruitvale, in the county of Alameda and State of California, have invented certain new and useful Improvements in Power-Transmitting Mechanism, of which the following is a specification.

My invention relates to that class of power-transmitting mechanism in which a controllable difference in rotative velocity between the driving and the driven shafts is provided for.

My invention consists, in connection with the driving and driven shafts, of the novel fluid-resistance device directly interposed between and rotatively differentially connected with said shafts and means for controlling the resistance of said device, as I shall now fully describe.

In the devices which I have illustrated in the drawings, and hereafter particularly described, I depend upon the well known principles of the incompressibility of liquids when confined, and the fluid friction generated by a stream of liquid when issuing through a more or less restricted orifice under pressure.

The object of my invention is to provide a simple and effective means whereby a driving shaft may be connected to a driven shaft in such a way as to enable an operator to vary their speed ratios determinately, from a condition of rest in the driven shaft, to the same speed for both shafts, (the driving shaft being assumed to run at constant speed) and without the use of gears or solid friction, as now commonly used.

I illustrate my invention by the accompanying drawings in which—

Figure 2:
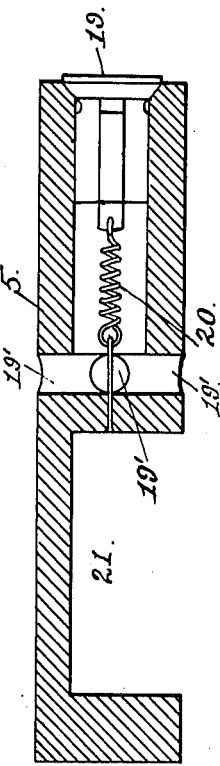

Figure 1 is a longitudinal section of my device in the form of multiple piston pump in which the cylinders and their pistons are arranged parallel with the center line of the shafts. Fig. 2 is an enlarged view of the piston with its inlet valve which, in this form, works automatically.

Describing, in detail the construction shown in Figs. 1 and 2, the driving shaft 1, and the driven shaft 2 are placed in line with each other, but not positively connected, and are arranged and combined with other parts of the device as follows:—To the driving shaft 1 is permanently fixed a housing or casing 3, having a plurality of cylindrical openings or pump chambers 4, in annular series, with their pistons 5, and a series of ports 6, leading from the outer end of said pump chambers 4, to a central well or reservoir 7. In the forward end of this central well, which is best made conical in form, is fitted the single controlling valve 8, which is also conical, and adapted to regulate the area of the communicating ports 6, where they enter the central well or reservoir 7. This valve 8 is so constructed and operated that it allows of a perfectly free passage for the liquid when it is fully withdrawn, or, by sliding it forward, it may be made to entirely close these ports thereby trapping the liquid in the pump chambers 4 and stopping the action of the pistons 5 which in turn hold the two shafts in a fixed relation to each other. This valve 8 is made hollow and open ended to allow of the free passage of the liquid through it to the central well or reservoir 7. The valve 8 is operated by the rods 9 which pass through the stuffing boxes 10 and are connected to the sliding collar 11 which is moved by the forked lever 12. All of the parts above enumerated except the driven shaft 2 always rotate with the driving shaft 1. To the driven shaft 2 is permanently fixed a cam or inclined flange 13 which is provided with anti-friction ball bearings in cages or containing rings 14. The faces of the cam are hardened and ground true, and the bearing plates or rings 15 are also hardened and ground in order to eliminate solid friction as far as possible. The outer faces of these bearing plates or rings 15 are made rounding as shown, in order to maintain a fixed thickness for the whole arrangement of cam, ball bearings and bearing rings in all positions which it may assume. The shaft 2 is arranged to pass through the rearward end of the housing or casing 3 in the bearing 16. The hub 17 also fixed to the shaft 2 is provided with a suitable anti-friction bearing 18 and a fiber washer 25 as shown, to take the thrust from the piston 5 acting through the cam 13. It will now be seen that any restriction of the ports 6 will cause the pistons 5 to move more slowly in their cylinders than when the ports are wide open, and, by this means, the speed of the driven shaft 2 will be brought more nearly to equal the speed of the driving shaft, and, at all times, will transmit the required amount of power to overcome the load imposed.

In the enlarged sectional view of the piston 5 shown in Fig. 2, it will be noted that said piston is hollow and open from end to end. In its forward end, it is controlled by the automatic inlet valve 19 with its spring 20 provided to insure its closing on the beginning of the pumping stroke. The rear or stem end of the piston is provided with ports 19', which admit the fluid freely through the piston, to fill the chamber 4, when the piston is on the return stroke, which freedom of circulation is required when the ports 6 are contracted in area by the valve 8. The notch 21 in the piston stem provides for withdrawing the piston positively.

It is well known that all liquids expand by the action of heat, therefore a sufficient air space is left in the casing to permit this expansion without injury to the machine. It is also well known that whenever friction of any kind is found heat will be generated. Therefore, provision is made for the radiation of this heat as particularly shown by the ribs or flanges 32 in Fig. 1.

Having thus fully described my invention what I claim as new and desire to secure by Letters Patent is:—

1. In power-transmitting mechanism, the combination of alined shafts; a closed casing receiving said shafts from opposite ends and attached to and rotatable with one of them, said casing having within it an annular series of piston chambers, each with a port opening into the central space of said series; a piston in each chamber; a rotatively differential connection between the pistons and the other shaft to operate them; a hollow open ended valve seated in the central space of the piston chamber series, to control the ports of said chambers; and means to operate the valve.

2. In power-transmitting mechanism, the combination of alined shafts; a closed casing receiving said shafts from opposite ends and attached to and rotatable with one of them, said casing having within it an annular series of piston chambers, each with a port opening into the central space of said series; a piston in each chamber; a flange on the other shaft rotatively differentially engaging the pistons to operate them; a hollow open ended valve seated in the central space of the piston chamber series, to control the ports of said chambers; and means to operate said valve.

3. In power-transmitting mechanism, the combination of alined shafts; a closed casing receiving said shafts from opposite ends and attached to and rotatable with one of them, said casing having within it an annular series of piston chambers, each with a port opening into the central space of said series; a piston in each chamber, each piston having a notched stem; an inclined flange on the other shaft rotatively differentially engaging the notched stems of said pistons to operate them; a hollow open ended valve seated in the central space of the piston chamber series, to control the ports of said chambers; and means to operate said valve.

4. In power-transmitting mechanism, the combination of a driving shaft; a driven shaft in alinement with the driving shaft; a closed casing receiving both shafts and attached to and rotatable with one of them, said casing having within it an annular series of piston chambers each with a port opening into the central space between the chambers, said space being of conical form; a piston in each chamber, each piston having a notched stem; an inclined annular flange on the other shaft, said flange rotatively differentially engaging the notched stems of the pistons; a hollow open ended conical valve in the central space of the piston chamber series to control the ports of said chambers; and means to operate said valve.

5. In power-transmitting mechanism, the combination of a driving and driven shaft; a closed casing receiving said shafts and attached to and rotatable with one of them, said casing having within it an annular series of piston chambers, each with a port opening into the central space of said series; a piston in each chamber, said piston having an opening through it controlled at one end by a valve; means for differentially connecting said pistons with the other shaft; a hollow open ended valve seated in the central space of the piston chamber series, to control the ports of said chambers; and means to operate said last named valve.

6. In power-transmitting mechanism, the combination of alined shafts; a closed casing receiving said shafts from opposite ends and attached to and rotatable with one of them, said casing having within it a piston chamber which at one end opens with its full cross-sectional area into the casing, and at the other end opens into the casing through a relatively restricted port; a piston in said chamber having a passage through it with an uncontrolled port at one end, and a valve at its other end controlling the communication between said passage and the port of the piston chamber; a rotatively differential connection between the piston and the other shaft; and a valve in the casing to control the port of the piston chamber.

7. In power-transmitting mechanism, the combination of alined shafts; a closed casing receiving said shafts from opposite ends and attached to and rotatable with one of them, said casing having within it an annular series of piston chambers, leaving a space at each end of the casing and a central space connecting said ends, each of said chambers at one end opening with its full cross sectional area into the casing and at the other end opening into said casing through a relatively restricted port; a piston in each chamber having a passage through it with a port at one end, and a valve at its other end controlling the communication between said passage and the port of the piston chamber; a rotatively differential connection between the pistons and the other shaft to operate them; and a hollow open ended valve seated in the central space of the piston chamber series and movable to control the ports of said chambers.

In testimony whereof I have signed my name to this specification in the presence of two subscribing witnesses.

CHARLES DAVID McCLINTOCK.

Witnesses:
 WM. F. BOOTH,
 D. B. RICHARDS.